United States Patent
Dovi et al.

(10) Patent No.: US 11,812,003 B1
(45) Date of Patent: Nov. 7, 2023

(54) SYSTEMS AND METHODS FOR SEPARATING AN IMAGE INTO A WHITE LAYER AND A COLOR LAYER FOR PRINTING WITH A WHITE TONER ENABLED PRINTER IN TWO PASSES

(71) Applicant: UI Technologies, Inc., Las Vegas, NV (US)

(72) Inventors: Joseph Dovi, Lake Grove, NY (US); Alfredo Padilla, Palm Bay, FL (US)

(73) Assignee: UI Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/304,683

(22) Filed: Apr. 21, 2023

Related U.S. Application Data

(60) Provisional application No. 63/336,122, filed on Apr. 28, 2022.

(51) Int. Cl.
  *H04N 1/60* (2006.01)
  *H04N 1/40* (2006.01)
  *H04N 1/00* (2006.01)
  *G06T 3/60* (2006.01)

(52) U.S. Cl.
  CPC ............. *H04N 1/6008* (2013.01); *G06T 3/60* (2013.01); *H04N 1/0044* (2013.01); *H04N 1/40012* (2013.01)

(58) Field of Classification Search
  CPC ............... H04N 1/6008; H04N 1/0044; H04N 1/40012; G06T 3/60
  USPC ......................................................... 358/518
  See application file for complete search history.

(56) References Cited

U.S. PATENT DOCUMENTS

| | | | |
|---|---|---|---|
| 8,159,720 B2* | 4/2012 | Fan | H04N 1/4053 358/1.9 |
| 8,205,981 B1 | 6/2012 | Marino et al. | |
| 8,298,737 B2 | 10/2012 | Kadokura | |
| 8,348,399 B2 | 1/2013 | Gengrinovich | |
| 8,351,100 B2 | 1/2013 | Mestha et al. | |
| 8,599,436 B2 | 12/2013 | Sano et al. | |
| 8,643,899 B2* | 2/2014 | Koyama | B41M 3/008 358/1.9 |
| 8,705,117 B1* | 4/2014 | McClelland | B41J 3/407 358/1.9 |
| 8,728,696 B2 | 5/2014 | Yamada | |
| 8,735,320 B2 | 5/2014 | La Costa | |
| 8,784,508 B2 | 7/2014 | Elis | |
| 8,851,641 B2 | 10/2014 | Kamiyam | |
| 9,383,684 B1 | 7/2016 | Josiah et al. | |

(Continued)

*Primary Examiner* — Allen H Nguyen
(74) *Attorney, Agent, or Firm* — Kevin Schraven; Heber Martin Carbajal; Hankin Patent Law, APC

(57) ABSTRACT

A method of splitting an image into a white layer and a color layer, comprising: providing an electronic application; receiving and loading, by the electronic application, an image file; the image file comprises a C color plane, a M color plane, a Y color plane, a K color plane, and a W color plane; splitting the image file to create a white layer and a color layer; erasing the K color plane; generating a CMY color plane; outputting the CMY color plane to a first storage location, to generate the color layer; copying, in the electronic application, the W color plane into the K color plane; erasing the C color plane, the M color plane, and the Y color plane to generate a W to K color plane; and outputting the W to K color plane to a second storage location, to generate the white layer.

30 Claims, 15 Drawing Sheets

(56) References Cited

U.S. PATENT DOCUMENTS

| | | |
|---|---|---|
| 9,835,983 B2 | 12/2017 | Josiah et al. |
| 10,942,690 B2 * | 3/2021 | Smith ................. H04N 1/54 |
| 11,409,207 B2 | 8/2022 | Josiah et al. |
| 2004/0252173 A1 | 12/2004 | Ben-Zur et al. |
| 2005/0264632 A1 | 12/2005 | Glass et al. |
| 2006/0034509 A1 | 2/2006 | Lu et al. |
| 2006/0162586 A1 | 7/2006 | Fresener et al. |
| 2008/0218539 A1 | 9/2008 | Hill et al. |
| 2009/0040249 A1 | 2/2009 | Wouters |
| 2012/0051816 A1 | 3/2012 | Chiyoda |
| 2013/0113854 A1 | 5/2013 | Iwata |
| 2013/0235398 A1 | 9/2013 | Bhatti et al. |
| 2013/0308985 A1 | 11/2013 | Kim |
| 2013/0330522 A1 | 12/2013 | Suzuki |
| 2015/0124271 A1 * | 5/2015 | Robinson ............. H04N 1/48 358/1.9 |

* cited by examiner

SYSTEMS AND METHODS FOR SEPARATING AN IMAGE INTO A WHITE LAYER AND A COLOR LAYER FOR PRINTING WITH A WHITE TONER ENABLED PRINTER IN TWO PASSES

CROSS-REFERENCE TO RELATED APPLICATIONS

This U.S. Non-Provisional Utility Patent Applications claims the benefit of and priority to U.S. Provisional Patent Application No. 63/336,122, filed on Apr. 28, 2022, by inventor Joseph Dovi, the contents of which are expressly incorporated herein by this reference.

FIELD OF THE DISCLOSURE

The present disclosure relates generally to systems and methods for splitting an image into a white layer and a color layer for printing with white toner in two passes. More specifically, the present disclosure relates to systems and methods for taking raster graphics files (PNG, JPG, TIFF, BMP, PSD, GIF, EPS, PS, PCX, etc.) as well as PDF files and creating two PDF files, one for the white layer and one for the color layer.

BACKGROUND

Colored printers have traditionally been used to print images on paper. Modern laser-toner printers can now produce images to be applied onto a variety of items including, t-shirts, mugs, binders, and almost anything with a flat surface. These printers often use toners which are available in two formats: cyan, magenta, yellow, and black (CMYK) toners or cyan, magenta, yellow, and white (CMYW) toners. Printers utilizing CMYW toner systems are frequently used to apply graphics and logos on dark items or clothing. When used with dark tone items, the white toner enhances the image, while darker colors may use the dark pigments of the surface instead of printing out more color. However, standard printing systems, and the underlying software, are unable to adequately modify the white layer. The white toner is often over applied or needs further alterations. Too much white toner can cause the image to appear distorted and can leave t-shirts feeling stiff or rigid and can leave an undesired sheen on the final image. Additionally, when not adjusted, white toner is often overapplied in standard images, which, when printed, results in the white toner bleeding onto the non-white toners.

Thus, there is a need in the art to provide users with the ability to customize the white layer independently of the color layer. This customization would help reduce white and non-white toner bleeding, allow users to fade the white portions, rasterize the white layer, and adjust how much of the color layer should be converted to the white layer. As such, there is a need for systems, devices, and methods to split an image into a color layer and white layer, which can then be printed in two passes.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

One embodiment may be a method for creating a white layer and a color layer for dual pass printing that may comprise: providing an electronic platform; receiving an image file from a user; processing said image file within said electronic platform to create a white layer and a color layer; and outputting said white layer and said color layer in one or more digital files. The electronic platform may preferably display a canvas area and one or more design parameters. Another embodiment of the method may comprise printing an image by first printing said color layer and then printing said white layer. Another embodiment may comprise printing an image by first printing said white layer and then printing said color layer.

The method may include allowing a user to rasterize the white layer or the color layer. Another embodiment may comprise adjusting rasterization parameters, which may include spot-shape, angle of the spot-shape, and frequency of the spot-shape. The method may comprise the step of previewing a rasterized white layer in a pixel preview window. The preview selector window preferably allows the user to select which portion of the white layer displays in the pixel preview window. In another embodiment, the method may comprise the step of previewing the rasterized color layer in the pixel preview window. The preview area selector window may allow a user to select which portion of the color layer displays in the pixel preview window.

Another embodiment may preferably comprise a method wherein said white layer and said color layer are rasterized; or another method wherein said white layer is rasterized, and another embodiment may preferably comprise wherein said color layer is rasterized. Another embodiment for a method may include allowing the user to adjust one or more parameters of the white layer. While another embodiment may comprise wherein parameters of the white layer include black sensitivity, white under black, remove black, choke, and feathering. Another method may allow users to save the digital files in or more sizes. The digital files may include all data within the canvas area, or in another embodiment, the digital files may include data only from the edited version of the image file. In another embodiment the method consists of allowing users to manipulate design parameters of the image files; and wherein design parameters include expanding the image fill to the canvas area, rotating the image file, flipping the image file about both vertical and horizontal axes, and centering the image within the canvas area. In another embodiment the method may allow the user to define, delete, and select canvas area sizes. The method may further comprise allowing said user to view the white layer, color layer, image file, or the combination of the white layer and color layer.

One embodiment may be a device for creating a white layer and a color layer for dual pass printing, comprising an electronic platform; an image file; wherein said electronic platform processes the image file to create a white layer and a color layer; and wherein the electronic platform outputs the white and color layers in one or more digital files. In another embodiment the electronic platform displays a canvas area and one or more design parameters; and wherein the white layer, color layer, image file, or the combination of the white layer and color layer is displayed in the canvas area.

In another embodiment, said electronic platform allows a user to rasterize the white layer or color layer. The electronic platform may allow users to adjust one or more rasterization parameters. In another embodiment, the rasterization parameters include one or more of: spot-shape, angle of said spot-shape, and frequency of said spot-shape. The device may further comprise of a pixel preview window, a preview area selector window, and wherein said preview selector window allows users to select which portion of the color layer or white layer displays in the pixel preview window. In another embodiment, the design parameters include a white layer creation parameter.

Another embodiment may be method of splitting an image into a white layer and a color layer, comprising; providing an electronic application; receiving, by the electronic application, an image file; wherein the image file comprises a cyan (C) color plane, a magenta (M) color plane, a yellow (Y) color plane, a black (K) color plane, and a white (W) color plane; splitting, by the electronic application, the image file to create a white layer and a color layer; wherein the splitting of the image file comprises: loading the C color plane, the M color plane, the Y color plane, the K color plane, and the W color plane into the electronic application; erasing the K color plane; generating a CMY color plane; and outputting the CMY color plane to a first storage location, such that the color layer is generated; copying, in the electronic application, the W color plane into the K color plane; erasing the C color plane, the M color plane, and the Y color plane, such that a W to K color plane is generated; and outputting the W to K color plane to a second storage location, such that the white layer is generated. The color layer and the white layer may be configured to print in two passes, such that a printed image is created. The color layer may be printed first. The white layer may be printed first. Creating of the white layer may comprise: converting a white toner data of the W to K color plane to grayscale, such that a grayscale data is created; converting the grayscale data to final white toner data by one or more of the following: removing any grayscale data that reads as black, based on a variable black sensitivity; adjusting a white under the black via a variable scale; choking the final white toner data; and feathering, based on sharpness and intensity. The method may further comprise: rasterizing the CMY color plane; and rasterizing the W to K color plane. The electronic application may be configured to receive one or more rasterization parameters for the rasterizing of the CMY color plane and the W to K color plane. The one or more rasterization parameters may be selected from the group of parameters consisting of: spot-shape; angle of the spot-shape; and/or frequency of the spot-shape. The method may further comprise: previewing the CMY color plane or the W to K color plane being rasterized in a pixel preview window; selecting, via a preview area selector window, which portion of the CMY color plane or the W to K color plane displays in the pixel preview window. The electronic application may be configured to run on one or more computing devices; wherein the one or more computing devices may be configured to be in communication with one or more printers that are configured to print the color layer and the white layer in two passes. In other embodiments, the electronic application may be configured to run on one or more computing devices; wherein the one or more computing devices are one or more printers that are configured to print the color layer and the white layer in two passes. The method may further comprise: registering the electronic application; providing the electronic application with serial information; verifying that a serial information of the electronic application is valid; if the serial information is not valid, then a watermark is added to at least one of the white layer and the color layer. The method may further comprise: verifying that a maximum page count has not been exceeded; if the maximum page count has been exceeded, then a watermark is added to at least one of the white layer and the color layer. The method may further comprise: exporting the white layer and the color layer to a canvas area for formatting, such that a preview image is created; and creating an output image file. The output image file may be saved as a PDF or PNG. The output image file may be configured to be saved in one or more sizes. The output image file may comprise all data on the canvas area or may comprise only image data on the canvas area. The method may further comprise: formatting the canvas area via a plurality of design parameters; wherein the plurality of design parameters may be selected from the group of design parameters consisting of: expanding the preview image to fill the canvas area; rotating the preview image; flipping the preview image; centering the preview image within the canvas area; setting a size of the canvas area; altering the size of the canvas area; and/or combinations thereof.

Another embodiment may be a method of splitting an image into a white layer and a color layer, comprising: providing an electronic application; receiving, by the electronic application, an image file; wherein the image file comprises a cyan (C) color plane, a magenta (M) color plane, a yellow (Y) color plane, a black (K) color plane, and a white (W) color plane; splitting, by the electronic application, the image file to create a white layer and a color layer; wherein the splitting of the image file comprises: loading the C color plane, the M color plane, the Y color plane, the K color plane, and the W color plane into the electronic application; erasing the K color plane; generating a CMY color plane; outputting the CMY color plane to a first storage location, such that the color layer is generated; copying, in the electronic application, the W color plane into the K color plane; erasing the C color plane, the M color plane, and the Y color plane, such that a W to K color plane is generated; converting a white toner data of the W to K color plane to grayscale, such that a grayscale data is created; converting the grayscale data to final white toner data by one or more of the following: removing any grayscale data that reads as black, based on a variable black sensitivity; adjusting a white under the black via a variable scale; choking the final white toner data; feathering, based on sharpness and intensity; rasterizing the CMY color plane; rasterizing the W to K color plane; and outputting the W to K color plane to a second storage location, such that the white layer is generated. The color layer and the white layer may be configured to print in two passes, such that a printed image is created. The color layer may be printed first. In other embodiments, the white layer may be printed first. The electronic application may be configured to run on one or more computing devices; wherein the one or more computing devices are configured to be in communication with one or more printers that are configured to print the color layer and the white layer in two passes. In other embodiments, the electronic application may be configured to run on one or more computing devices; wherein the one or more computing devices are one or more printers that are configured to print the color layer and the white layer in two passes. The method may further comprise: exporting the white layer and the color layer to a canvas area for formatting; and creating an output image file.

Another embodiment may be a method of splitting an image into a white layer and a color layer, comprising:

providing an electronic application; receiving, by the electronic application, an image file; wherein the image file comprises a cyan (C) color plane, a magenta (M) color plane, a yellow (Y) color plane, a black (K) color plane, and a white (W) color plane; splitting, by the electronic application, the image file to create a white layer and a color layer; wherein the splitting of the image file comprises: loading the C color plane, the M color plane, the Y color plane, the K color plane, and the W color plane into the electronic application; erasing the K color plane; generating a CMY color plane; outputting the CMY color plane to a first storage location, such that the color layer is generated; copying, in the electronic application, the W color plane into the K color plane; erasing the C color plane, the M color plane, and the Y color plane, such that a W to K color plane is generated; converting a white toner data of the W to K color plane to grayscale, such that a grayscale data is created; converting the grayscale data to final white toner data by one or more of the following: removing any grayscale data that reads as black, based on a variable black sensitivity; adjusting a white under the black via a variable scale; choking the final white toner data; feathering, based on sharpness and intensity; rasterizing the CMY color plane; rasterizing the W to K color plane; wherein the electronic application is configured to receive one or more rasterization parameters for the rasterizing of the CMY color plane and the W to K color plane; wherein the one or more rasterization parameters is selected from the group of parameters consisting of: spot-shape; angle of the spot-shape; and frequency of the spot-shape; previewing the CMY color plane or the W to K color plane being rasterized in a pixel preview window; selecting, via a preview area selector window, which portion of the CMY color plane or the W to K color plane displays in the pixel preview window; outputting the W to K color plane to a second storage location, such that the white layer is generated; exporting the white layer and the color layer to a canvas area for formatting, such that a preview image is created; formatting the canvas area via a plurality of design parameters; wherein the plurality of design parameters are selected from the group of design parameters consisting of: expanding the preview image to fill the canvas area; rotating the preview image; flipping the preview image; centering the preview image within the canvas area; setting a size of the canvas area; altering the size of the canvas area; and combinations thereof; creating an output image file; wherein the output image file is configured to be saved in one or more sizes; wherein the output image file is saved as a PDF; and wherein the color layer and the white layer are configured to print in two passes, such that a printed image is created. The electronic application may be configured to run on one or more computing devices; wherein the one or more computing devices are configured to be in communication with one or more printers that are configured to print the color layer and the white layer in two passes. In other embodiments, the electronic application may be configured to run on one or more computing devices; wherein the one or more computing devices are one or more printers that are configured to print the color layer and the white layer in two passes.

While in another embodiment, the white layer creation parameter comprises one or more of: black sensitivity sliding scale, white under black, remove black, choke, and feathering. The digital files may be configured to be saved in one or more sizes. Digital files may include data from the entire canvas area or may include only date form the edited version of the image file. In another embodiment, the design parameters of the device may comprise of one or more of: expanding the image file to fill the canvas area, rotating the image file, flipping the image file about both vertical and horizontal axes, and centering the image file within the canvas area. In another embodiment, canvas area sizes are created, deleted, or selected, by the users.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps, which are illustrated. When the same numeral appears in different drawings, it refers to the same or like components or steps.

DETAILED DESCRIPTION OF THE DRAWINGS

Figure 1:
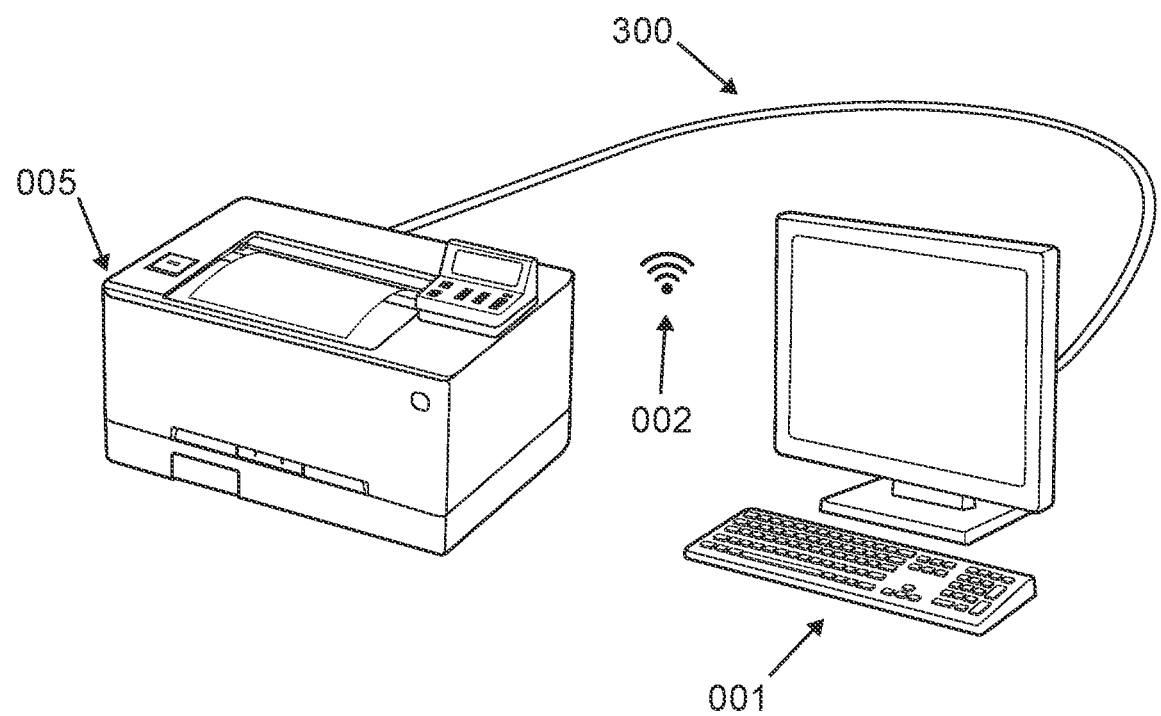
FIG. 1 is an illustration of one embodiment of a computer connected to a printer via wireless or physical connection.

In the following detailed description, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of embodiments.

While multiple embodiments are disclosed, still other embodiments will become apparent to those skilled in the art from the following detailed description. As will be realized, these embodiments are capable of modifications in various obvious aspects, all without departing from the spirit and scope of protection. Accordingly, the screen shots, figures, and the detailed descriptions thereof, are to be regarded as illustrative in nature and not restrictive. Also, the reference or non-reference to a particular embodiment shall not be interpreted to limit the scope of protection.

As used herein, the term "toner" generally refers to a powder, particulate, or dry ink that is used in laser printers, printers, and printing machines to form the printed text and images on the medium being printed. Generally, toner particles are melted by the heat of a fuser and are bound to the media.

Regarding a CMYW printer, the letter "W" preferably stands for white but may also refer to a non-standard toner or toner color, such as white, clear, clear fluorescent, metallic, ceramic, and/or security.

The raster image processing (RIP) Software may have other layout functions, including combining multiple print jobs to optimize the use of a particular substrate and reduce the amount of remnants of substrate after the print job. This is important for lowering the costs of the print job, especially when using a transfer substrate.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web implemented computer software. Any suitable computer-readable storage medium may be utilized including, but not limited to, hard disks, CD-ROMs, optical storage devices, or magnetic storage devices. Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well known structures and devices are shown in block diagram form to facilitate describing these embodiments.

In the following description, certain terminology is used to describe certain features of the embodiments disclosed herein. For instance, the terms "computer", "computer system", "computing device", mobile computing device", "electronic data processing unit", or "server" refer to any device that processes information with an integrated circuit chip, including without limitation, personal computers, mainframe computers, workstations, servers, desktop computers, portable computers, laptop computers, embedded computers, wireless devices, including cellular phones, personal digital assistants, tablets, tablet computers, smart phones, portable game players, wearables, smart devices and hand-held computers.

As used herein, the term "Internet" refers to any collection of networks that utilizes standard protocols, whether Ethernet, Token ring, Wi-Fi, asynchronous transfer mode (ATM), Fiber Distributed Data Interface (FDDI), code division multiple access (CDMA), global systems for mobile communications (GSM), long term evolution (LTE), other related communication protocols, or any combination thereof.

As used herein, the term "website" refers to any document written in a mark-up language including, but not limited to, hypertext mark-up language (HTML) or virtual reality modeling language (VRML), dynamic HTML, extended mark-up language (XML), wireless markup language (WML), or any other computer languages related thereto, as well as to any collection of such documents reachable through one specific Internet Protocol Address or at one specific World Wide Web site, or any document obtainable through any particular Uniform Resource Locator (URL). Furthermore, the terms "webpage," "page," "website," or "site" refers to any of the various documents and resources on the World Wide Web, in HTML/XHTML format with hypertext links to enable navigation from one page or section to another, or similar such resources used on the Internet.

The systems and methods of the present disclosure preferably allow a white toner cartridge to be used in a CMYW printer and create a white layer for printing. An image is provided, in any format, such as PNG, JPG, TIF, BMP, PSD, PDF, and the like. After desired parameters are entered by the user, the image is split into two data files. One contains the white layer of the image, and the other includes the color layer which may composed of CMY data. Preferably the output files are PDF or PNG, but they can be any format that is required by the printer that will print both images/layers in two passes. Once an image is uploaded into the software, the image will preferably be assessed to determine whether a transparency layer has been encoded. Because the disclosure relies on a transparency layer, any image without transparency information will be rejected. Should a file not have a transparency layer, the software will preferably abort further operations, and a message may display informing the user that a file formats require transparency data. Preferably, the systems and methods of the present disclosure may rely on there being a transparency layer to generate the white, which is why any file without a transparency layer is rejected. Although GIF, PCX and BMP do not support transparency information currently, future iterations of these programs may, so they may then be used with the methods and systems of the present disclosure.

In some embodiments, the systems and methods may keep track of total pages created and cease to function at some preset number of pages. More pages can be added if needed.

FIG. 1 is an illustration of one embodiment of a computer connected to a printer via wireless or physical connection. FIG. 1 shows a computer 001 connected to a printer 005. Computer 001 may be a personal computer, business computer, or server, including, but not limited to: a laptop, desktop, mobile device, or tablet. The computer 001 is shown in FIG. 1 as being connected to printer 005 by a physical hardwire 003 or wireless connectivity 002, such as by Wifi®.

Figure 2:
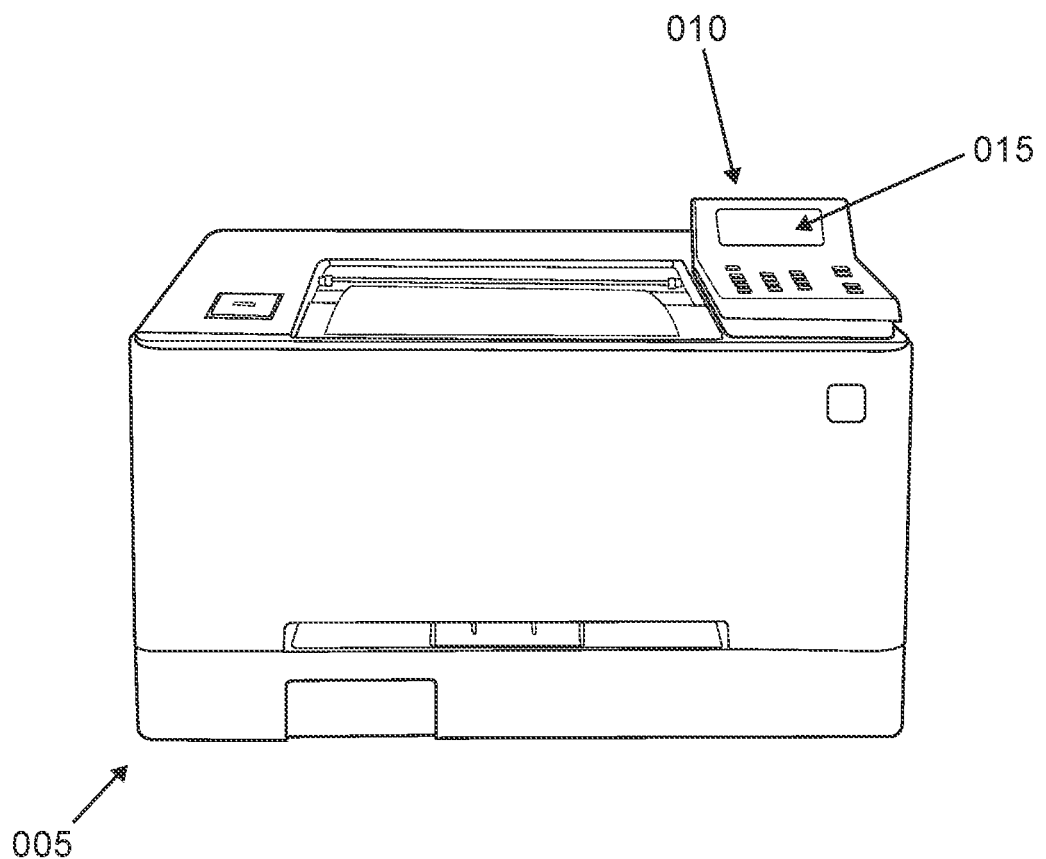
FIG. 2 is an illustration of one embodiment of a printer with a touch screen graphic user interface (GUI).

FIG. 2 is an illustration of one embodiment of a printer with a touch screen graphical user interface (GUI). FIG. 2 is that printer 005 may have a display 010, which may be a touch screen graphical user interface (GUI) 015. Preferably, the GUI 015 on display 010 may allow the user to interact with the printer and set certain parameters, including for image splitting in accordance with the systems and methods of the present disclosure. Display 010 may also be a non-touch screen display that is connected to an input device, such as a keypad. In various embodiments, the system and methods of the present disclosure may allow the user to import files into the electronic platform via the GUI using the following formats: Joint Photographic Experts Group (JPEG, JPG), Tagged Image File Format (TIFF), PhotoShop® document (PSD), Graphics Interchange Format (GIF), Encapsulated PostScript (EPS), PostScript (PS), Windows Graphics (BMP), or Picture Exchange (PCX).

Figure 3:
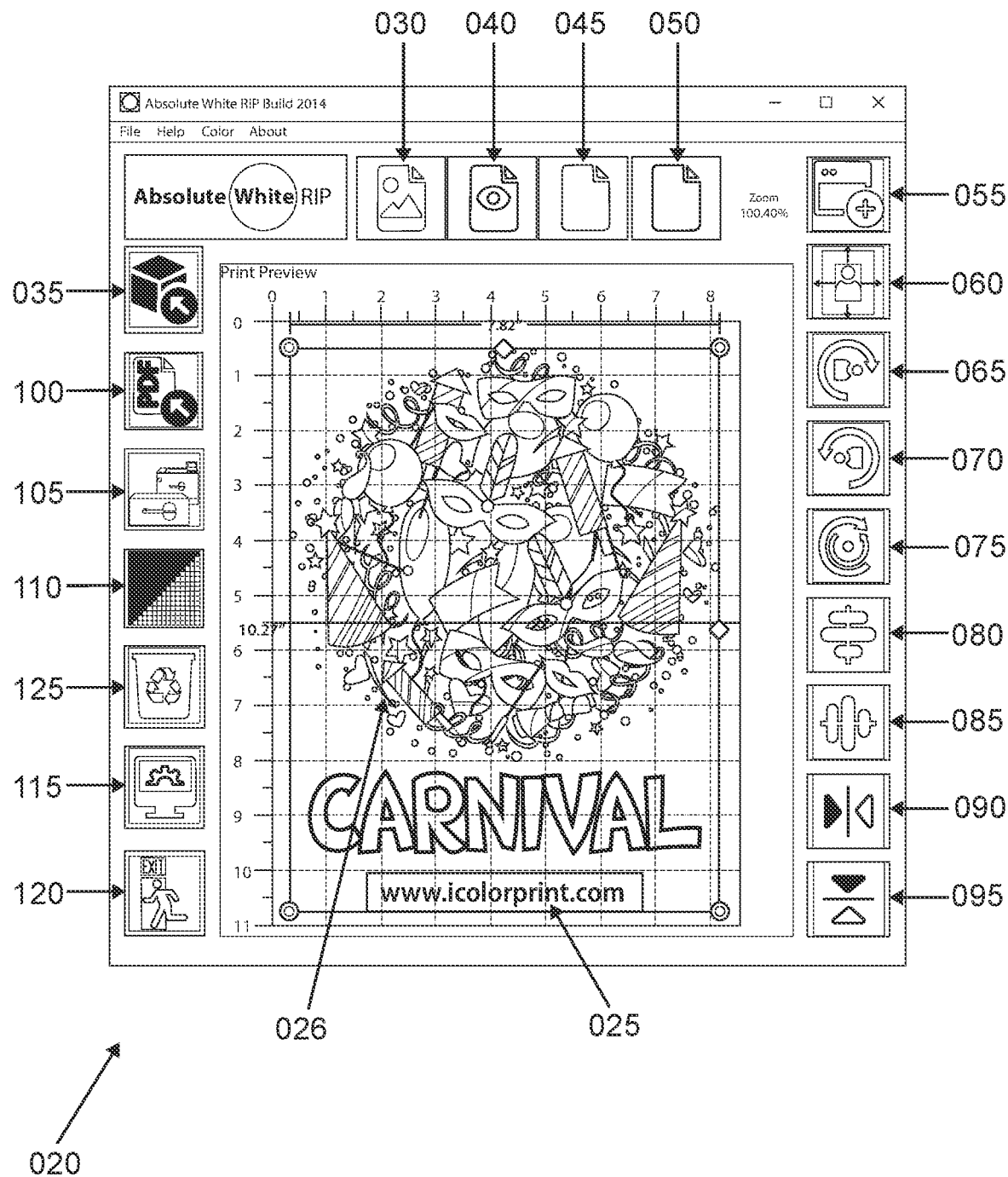
FIG. 3 is an illustration of one embodiment of the user interface for manipulating the images to be printed in two passes.

FIG. 3 is an illustration of one embodiment of the user interface for manipulating the images to be printed in two passes. FIG. 3 shows that the user interface for manipulating images that are to be printed on a printer in two passes may comprise graphical user interfaces (GUI) 020, which may be displayed on computer 001. In other embodiments the GUI 020 may be displayed on the printer itself, such as printer 005, or a mobile device. The GUI 020 may be interfaced with via touch screen, mouse movement and clicks, a keyboard or keypad, or other digital and/or tactile interface devices.

The GUI 020 may preferably be an interactive display of an image provided by the image splitting software-based system that is operating on the computer 001 or the printer 005. The GUI 020 may comprise a canvas area 025, which allows the user to upload artwork files, including by dragging and dropping the artwork. In other embodiments, the user may utilize the import graphic command 035 to access the artwork file and transfer the image of the artwork file into the canvas area 025. The canvas area 025 preferably allows the user to view and manipulate a preview image 026 of the artwork, including, but not limited to sizing and positioning the artwork. Preferably, the image splitting software-based system determines if the uploaded artwork file contains a transparency layer. Because the system relies on the transparency layer to generate the white layer, any file without transparency information may be rejected. An error message may be displayed, and the import/upload operation may not be completed.

Preferably, the system provides various functions or design parameters that allow a user to alter the preview image 026 displayed on the GUI 020. These functions may be displayed as graphical icons that act as selectable commands or buttons. The commands may be selected via touch screen, point and click via a mouse, or through tab-and-select via a keyboard. Although a specific graphical icon is shown in FIG. 3, it should be understood that any graphic identifier may be used.

An original graphic radio command 030 may be available to switch to a view of the unmodified, original version of the artwork. A preview function command 040 may allow the user to preview the artwork as it will print, including any and all changes made to the preview image 026 of the artwork. The preview image 026 may preferably be the combination of the edited color layer and white layer. The user may preferably view and then edit just the white layer by selecting the white layer command 045. The user may preferably view and then edit just the color layer by selecting the color layer command 050. The design parameters allow a user to format or manipulate the preview image 026 that is being displayed on the canvas area 025 and/or manipulate the canvas area 025 itself. The system may preferably include a canvas area Select/Define command 055, which may allow users to alter the size of the of the canvas area 025. In various embodiments, the size of the canvas area 025 may be set. An enlarge/fit-to-canvas command 060 may preferably be included that may expand the preview image 026 (and thus the artwork) to fill the canvas area 025. One embodiment of the system may allow the user to rotate the preview image 026 via a rotate clockwise command 065, a rotate counter-clockwise command 070, and an upright command 075. There may preferably be functions that allow the user to flip the graphic with respect to the X axis or Y axis using the X axis rotation command 080 or the Y axis rotation command 085. Users may have the option to center the graphic in the canvas area 025 using the vertical centering command 090 or the horizontal center command 095. Users may preferably extract the image using the export image command 100.

In some embodiments, the user may adjust the white-layer creation parameters through the white-layer creation parameters command 105. Rasterization may be manipulated using the activate/configure image rasterization command 110. Additionally, the user may access and amend the settings of the image splitting software-based system through the settings command 115. To exit and save, the user may select the exit/close command 120. The recycle 125 command allows the user to dispose of the image.

Figure 4:
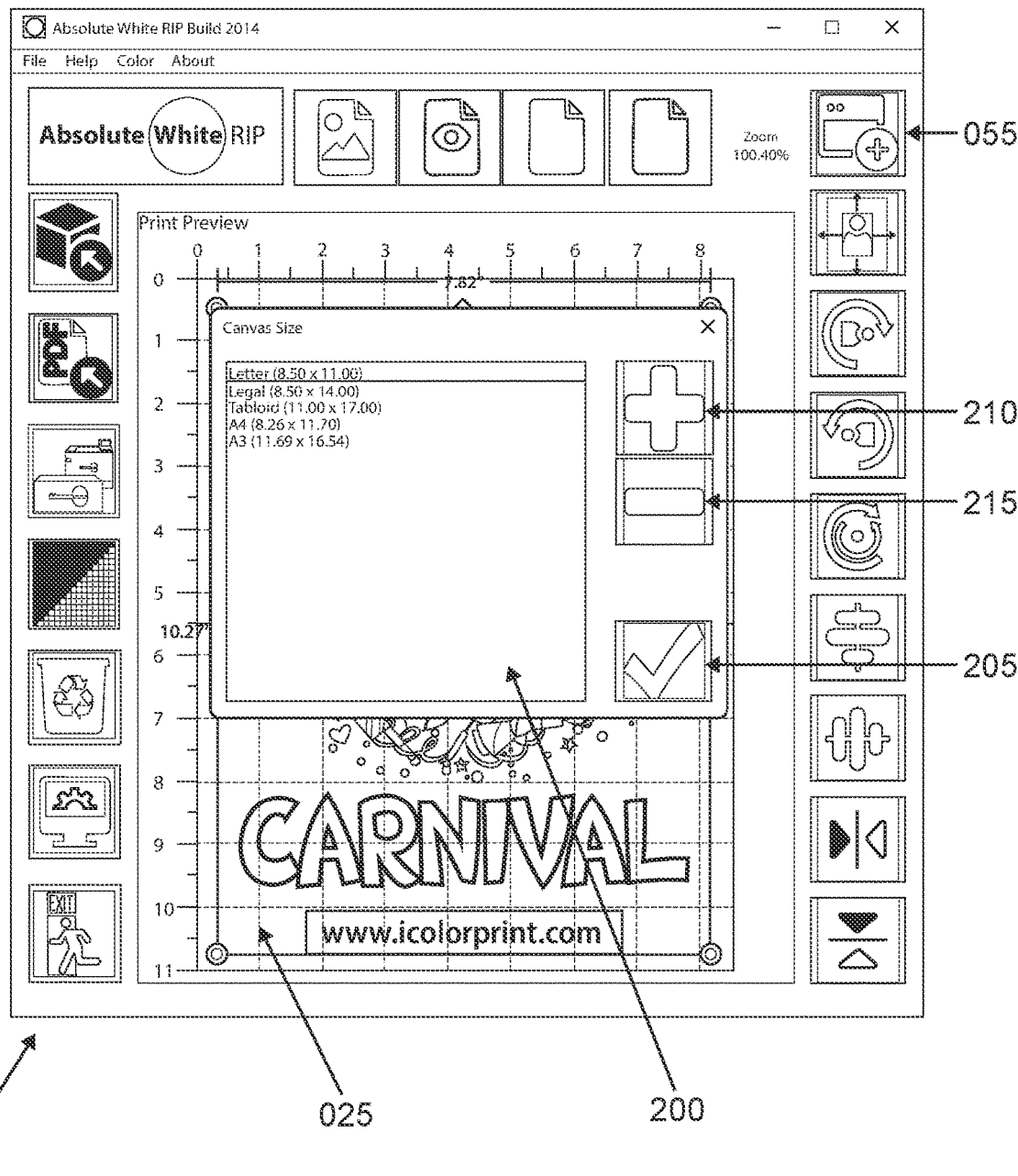
FIG. 4 is an illustration of one embodiment of the user interface for manipulating the images to be printed in two passes and showing canvas sizing options.

FIG. 4 is an illustration of one embodiment of the user interface for manipulating the images to be printed in two passes and showing canvas sizing options. As shown in FIG. 4, the canvas 025 displays on the GUI 020 an image uploaded to the system. FIG. 4 shows the select/define canvas area window 200, which allows users to select 205 one of the several pre-defined or previously created canvas sizes. The select/define canvas area window 200 may preferably be accessed by selecting canvas area select/define command 055. The user may also create a new canvas size 210 or delete a previously saved canvas size 215. The select/define canvas area window 200 may preferably be accessed by selecting canvas area select/define command 055.

Figure 5:
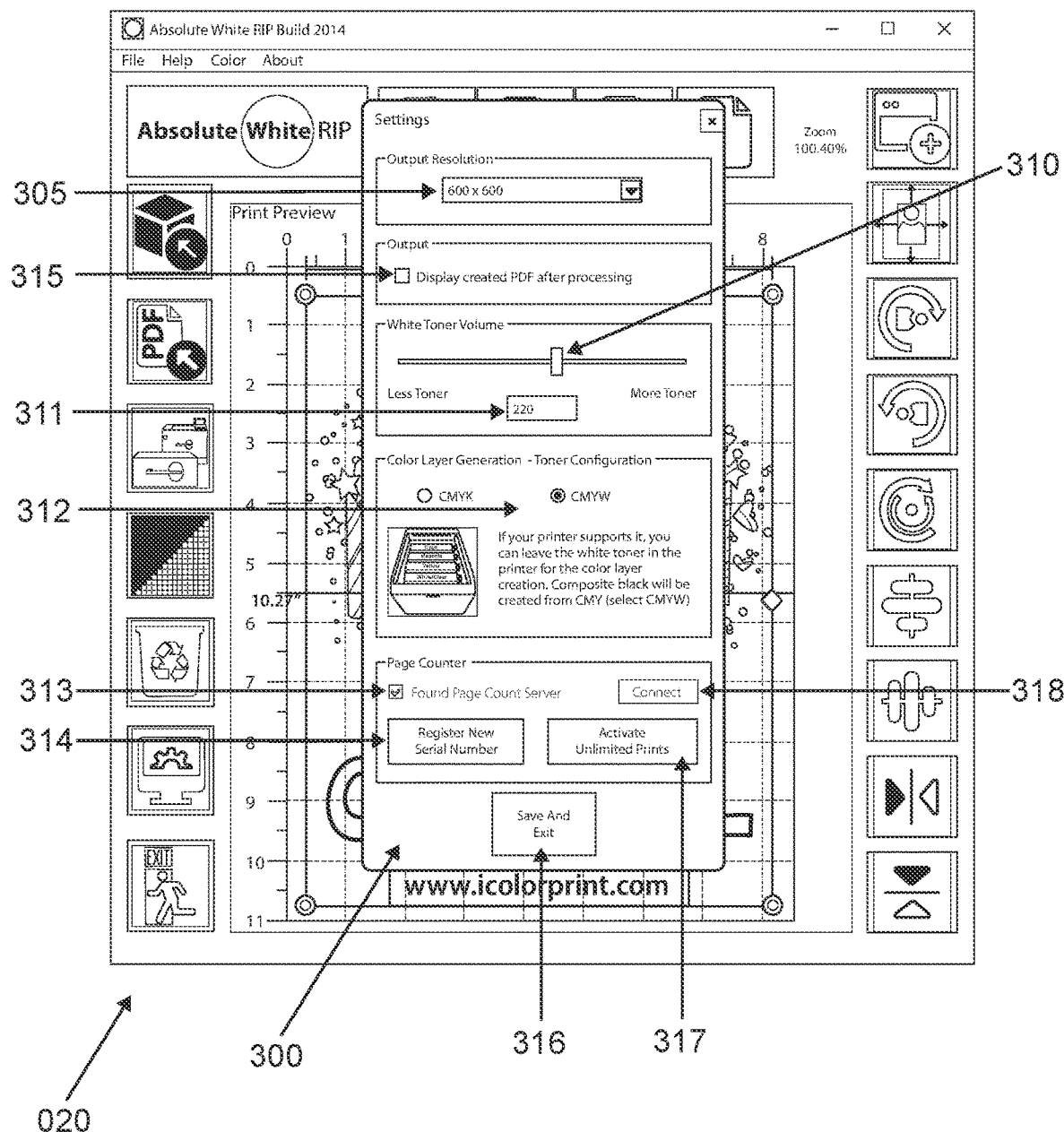
FIG. 5 is an illustration of one embodiment of the user interface for the output PDF showing the settings functions.

FIG. 5 is an illustration of one embodiment of the user interface for the output PDF showing the settings functions. As shown in FIG. 5, when the settings command 115 is selected the output PDF setup configurations window 300 is displayed. The output PDF setup configurations window 300 may allow the user to select the graphics output resolution of the image 305. The Output Display PDF 315 may specify to open the output PDF(s) using the default Windows PDF viewer selected. The white toner volume 310 may select the max toner limit 311 with a range 0 to 400. The toner configuration 312 for the color page may not use K when CMYW is selected, the page count server 313 may indicate if the page number/validation server was found upon startup, the register a new serial number 314 may register a serial number (supplied with each white toner cartridge), which sets a number of page creations. The server connect 318 may, if the validation server is not connected, try to find and connect to the validation server, and may be disabled if or when the validation server is connected. The unlimited prints 317 may enable an "unlimited prints mode" option, which may not have a page-creation limitation. The Save And Exit command 316 may exit the settings dialog and save the updates and changes. To close the output PDF setup configurations window 300 the user may select the exit/close command 120.

Figure 6:
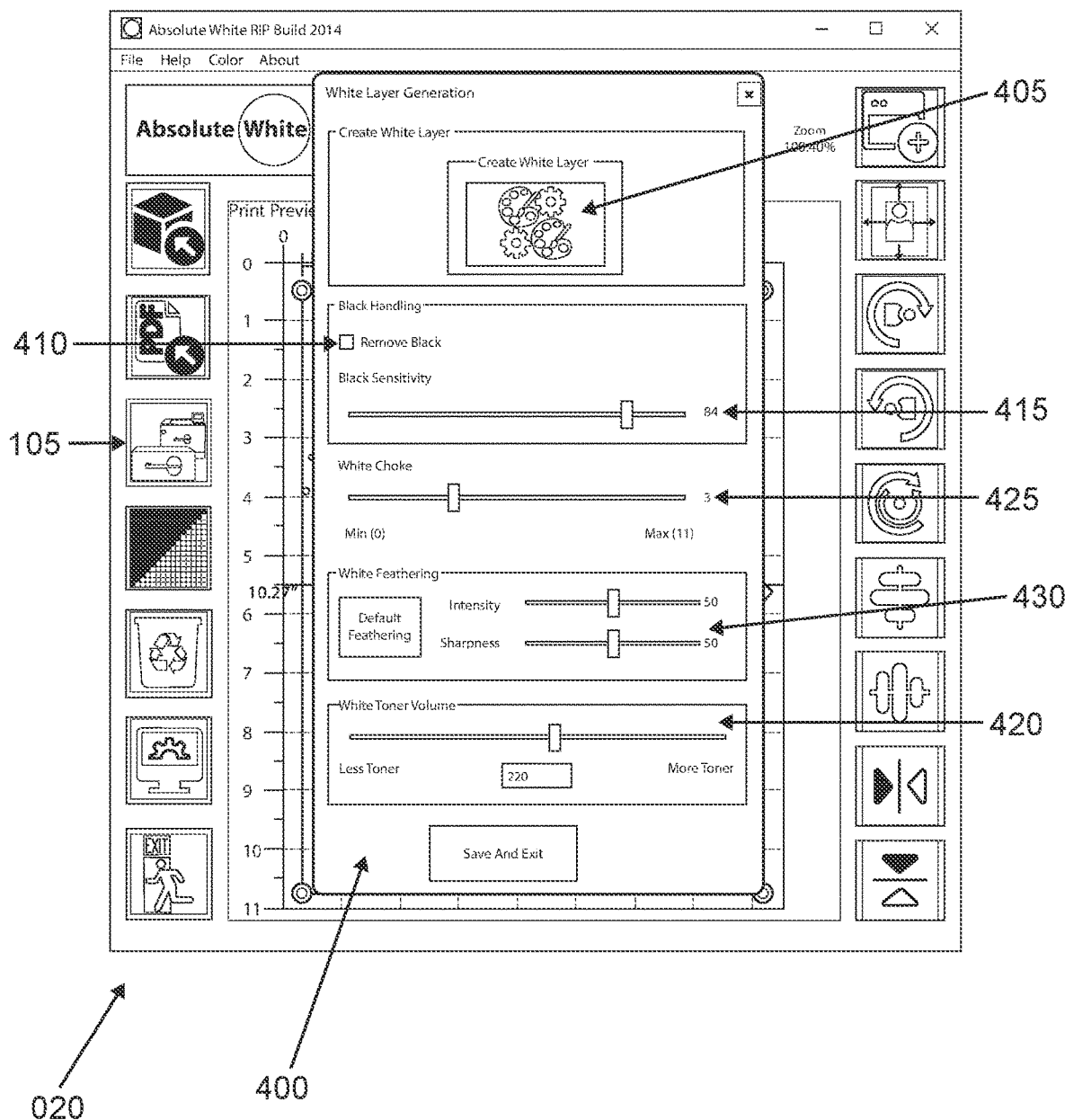
FIG. 6 is an illustration of one embodiment of the user interface for manipulating the images to be printed in two passes showing the white layer generation parameters.

FIG. 6 is an illustration of one embodiment of the user interface for manipulating the images to be printed in two passes showing the white layer generation parameters. When the user selects the white-layer creation parameters command 105, the white layer creation parameters window 400 is displayed on GUI 020. The white layer creation parameters window 400 may allow the user to set up and configure the white layer to conform with printing and product needs. A user may select the create white layer command 405 to re-generate the white layer after changing the parameters or settings. A black sensitivity sliding scale 415 may preferably be included that allows the user to select the threshold used to determine if a color in the artwork is black. A remove black box 410 may allow users to selectively remove all colorants determined by the system to be black. A color may be deemed to be black based on a raster image processing (RIP) based algorithm that compares color layer data to the black sensitivity sliding scale. If black components within the color layer are considered to be more black or equal to the level indicated by the black sensitivity sliding scale 415, the color layer data is deleted and replaced with white data. A white toner volume sliding scale 420 may allow users to add a certain amount of white underneath black colors. If a colorant of the artwork is determined to be a shade of black, based on the set level of the black sensitivity sliding scale 415, a certain percentage of white can be added underneath the colorant via the white toner volume sliding scale 420. The white toner volume sliding scale 420 may allow the user to adjust the percentage of added white.

The white layer often includes a call for large amounts of white to be used. When too much white is used, the white toner may bleed into other colors on the printed image. A white choke option 425 may be included to allow the user to shrink back the edges of the white layer to alleviate color bleeding. Feathering may be another parameter available for users to adjust. Feathering 430 modifies the behavior of the white colorant as the white color fades in and/or out. As shown in FIG. 6, the feathering 430 may be set by the user via an intensity sliding scale and a sharpness sliding scale.

In various embodiments, generation or creation of the white layer may comprise creating white colorant values from transparency layer values, and may take into account, not only the transparency information, but also the "darkness" of a color value. The white layer creation may also allow for the introduction of white colorant under a certain color value, such as "black".

The system may have various memory storage areas where image information is located:
Master Bitmap (unaltered copies of the graphics)
Color Bitmap (preferably in CMYK or RGB pixels; if "remove black" or some other transformation was applied to the graphic, it may reflect in this bitmap
White Layer (the actual white pixels in a monochrome TIFF format)
Alpha Layer (his layer may preferably include the transparency information and may be used to create the white and/or or other layers.

Figure 7:
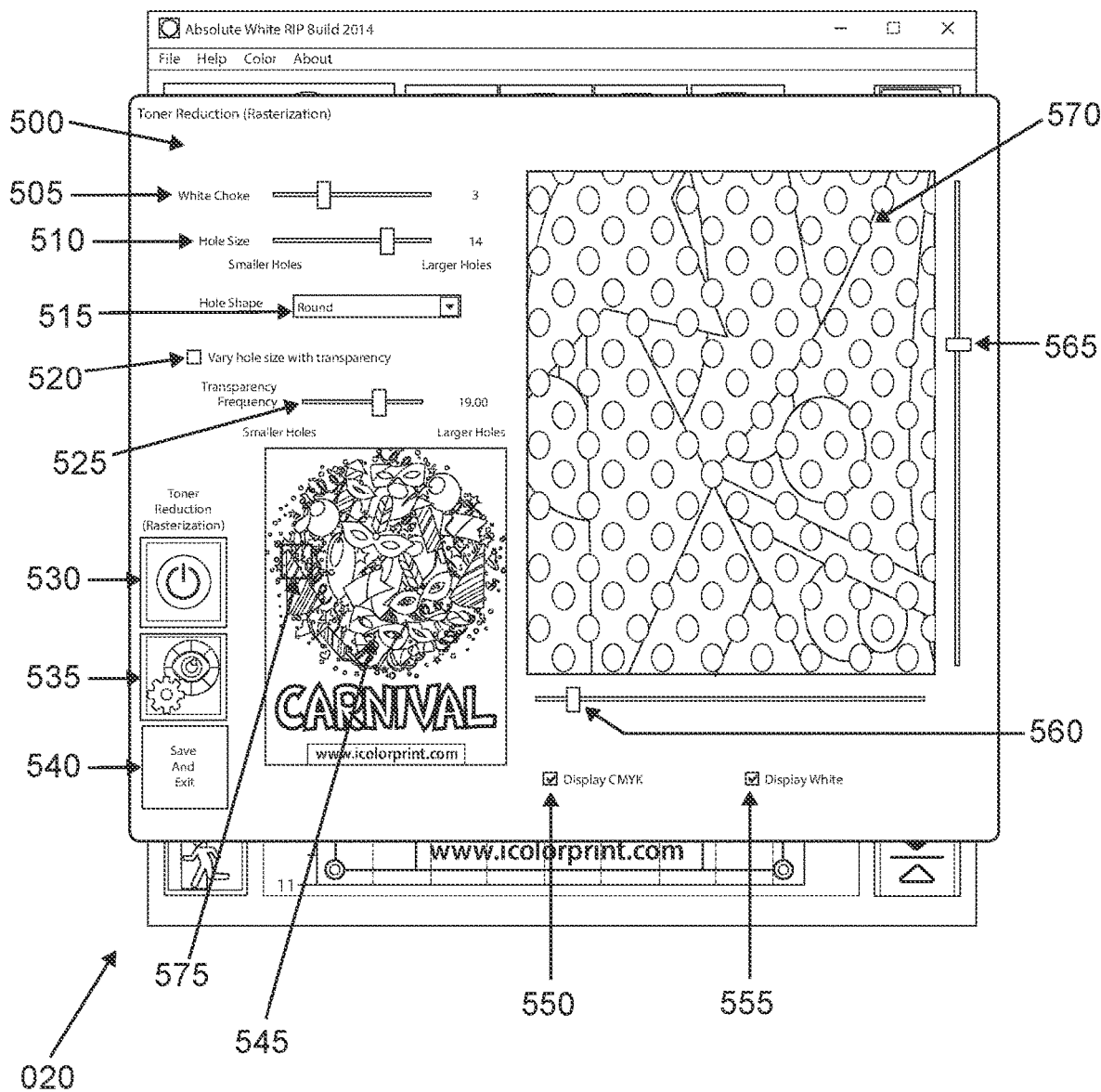
FIG. 7 is an illustration of one embodiment of the user interface for manipulating the images to be printed in two passes showing coverage reduction/rasterization.

FIG. 7 is an illustration of one embodiment of the user interface for manipulating the images to be printed in two passes showing coverage reduction/rasterization. FIG. 7 shows one embodiment of the GUI 020 for manipulating the images to be printed in two passes showing the toner reduction rasterization window 500. The toner reduction rasterization window 500 may be brought up by the user selecting the activate/configure image rasterization command 110. The toner reduction rasterization window 500 may comprise a main preview, zoomed in to the pixel-level window 570. Rasterization may be the feature that may allow for the reduction of colorant/toner used. The main preview window 570, may be a zoomed in view to the pixel-level, shows a close-up view of part of an image, in this case a raster image that is a series of pixels, dots, and/or lines, that when displayed together create an image that appears as shapes (when not in a close-up view). Using too much colorant can leave clothing that has a graphic printed on it feeling stiff where the graphic has been printed, rasterization by manipulating and removing certain pixels, dots, and/or lines may soften the feel of the shirt covered by a graphic. One embodiment of the toner reduction rasterization window 500 may allow users to adjust white choke 505, hole size 510, hole shape 515, and transparency hole size select 520, mesh size of hole 525. One embodiment of the hole size 510 parameter may determine the size of the holes that will be created in the artwork. The hole shape 515 option may select the shape of the holes that will be created. One embodiment of the transparency hole size select 520 may determine whether to use the artwork's transparency (Alpha channel) value to determine the size of the hole. One embodiment the mesh size of hole 525 may select the "mesh size" of the hole pattern created with the "transparency-based rasterization" mechanism. Users may toggle the rasterization by toggle switch 530, doing so will change the display within the toner reduction rasterization window 500 to show either the rasterized image or the non-rasterized image. A user may preview the entire image while editing portions with a full-page preview thumbnail 545. A user may preferably preview the image using image regenerate command 535, which applies all user settings entered within the toner reduction rasterization window 500. In one embodiment, the display CMYK 550 may indicate whether or not to display the color data in the main preview window 570. One embodiment of the display white 555 may indicate whether or not to display the white data in the main preview window 570. Vertical and horizontal scroll bars 565, 560 may allow the user to view the image in the pixel preview window 570. A preview area selector window 575 may preferably allow the user to select the portion of the image to display in close up in the rasterization image preview window 570. The save and exit 540 selector/command may allow a user to save adjustments made and exit the toner reduction rasterization window 500 settings window.

Figure 8:
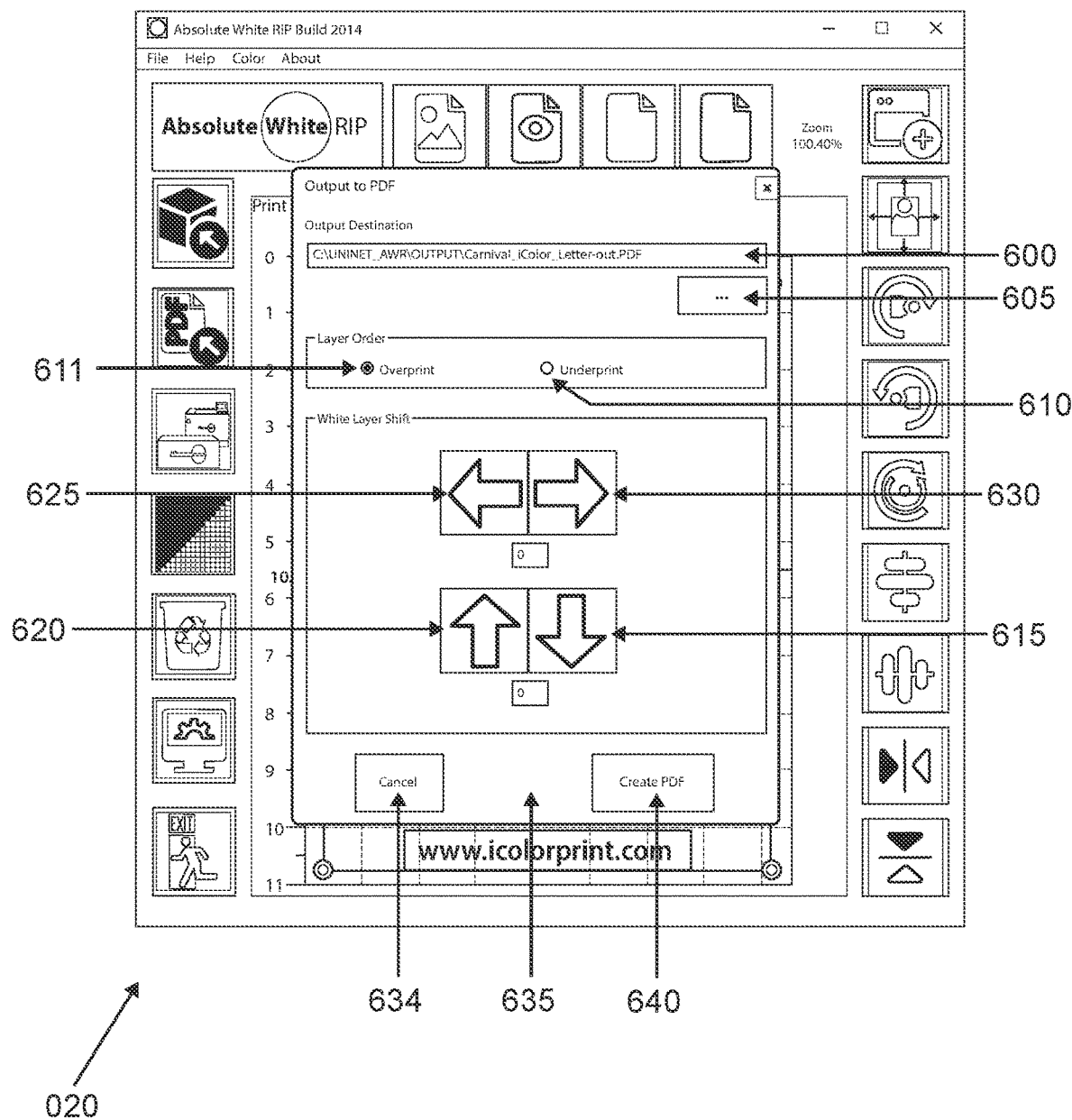
FIG. 8 is an illustration of one embodiment of the user interface for manipulating the images to be printed in two passes showing the output file creation and formatting.

FIG. 8 is an illustration of one embodiment of the user interface for manipulating the images to be printed in two passes showing the output file creation and formatting. FIG. 8 shows one embodiment of the output file creation and formatting window 635. This interface may preferably be accessed by selecting the export image command 100. In the creation and formatting window 635, a user may select to save the final image in one or more formats. The final image saved in one or more formats may be referred to as the output image file, final output image file, or final image file. There may be two different formats to choose from, but more and different formats may be integrated in the system of the present disclosure. In various embodiments, the user may either save the entire canvas area 025, including the image, or just the image itself. The user selects browse button 605 which may allow the user to navigate to a desired destination folder. The output file creation and formatting window 635 may also provide the user with an output destination bar 600, which may provide a destination/electronic file pathway to which to save either the image or canvas graphic. The overprint mode 611 may allow the CMYK to print first and the white to print second. The underprint 610 may allow the white to print first and CMYK to print second. The white layer shift left arrow 625 may shift the white layer left and the white layer shift right arrow 630 may shift the white layer right, by pixel. The white layer shift up arrow 620 may shift white layer up and the white layer shift down arrow 615 may shift the white layer down, by pixel. The Create PDF command 640 may create and save the PDF to the output destination identified in the output destination bar 600. The Cancel command 634 may exit dialog without creating PDF.

Figure 9:
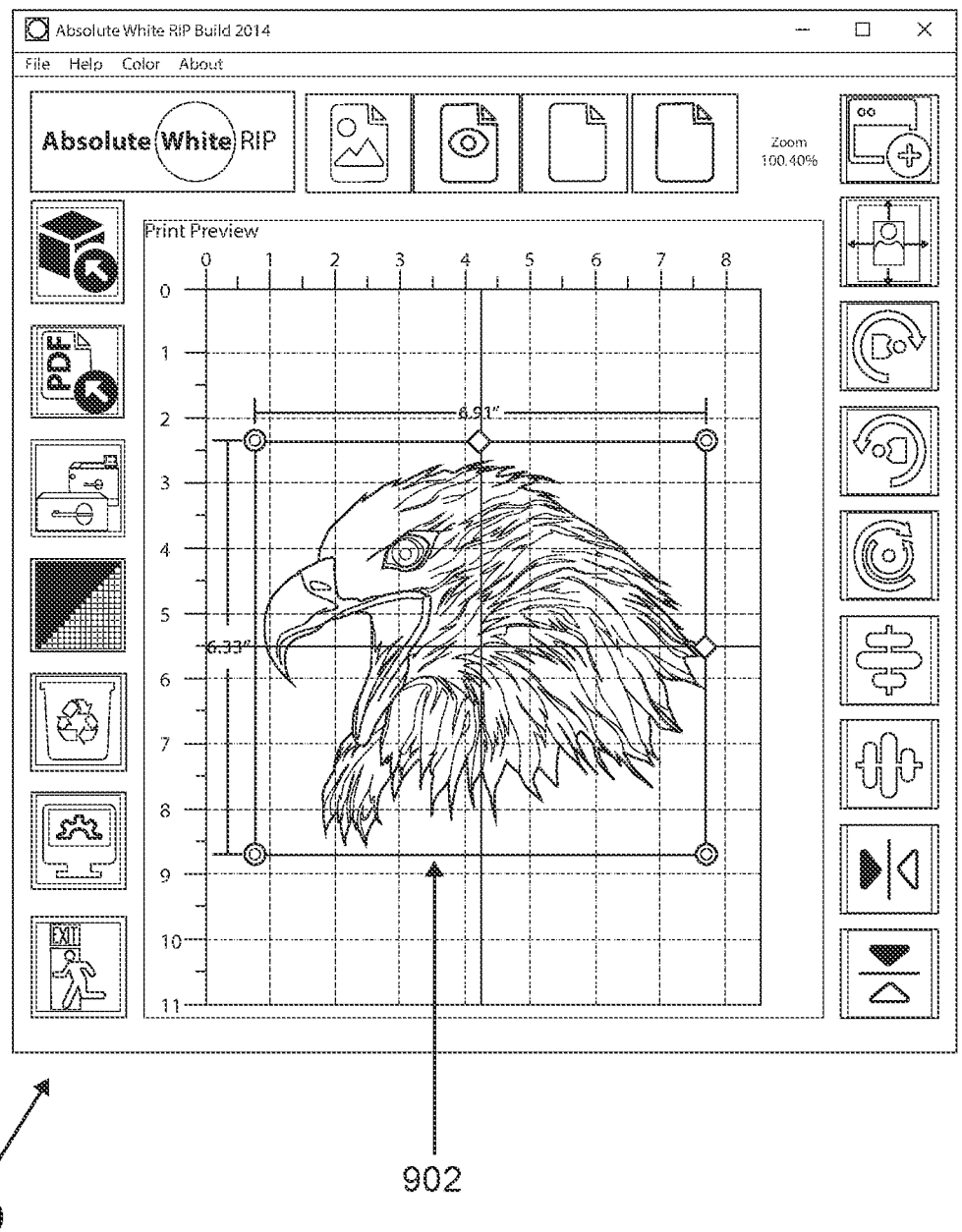
FIG. 9 is an illustration of one embodiment of the user interface for previewing the final image after white layer processing.

FIG. 9 is an illustration of one embodiment of the user interface for previewing the final image after white layer processing. FIG. 9 shows one embodiment of the GUI 020 for manipulating the images to be printed in two passes showing an example of a print preview window 902 displaying an image after white layer processing. This print preview window 902 may preferably display the image after the user has finished adjusting rasterization and white layer processing. The final image may display on the canvas area 025 over a grided background with dimensions so that users may know the size of the image prior to printing.

Figure 10:
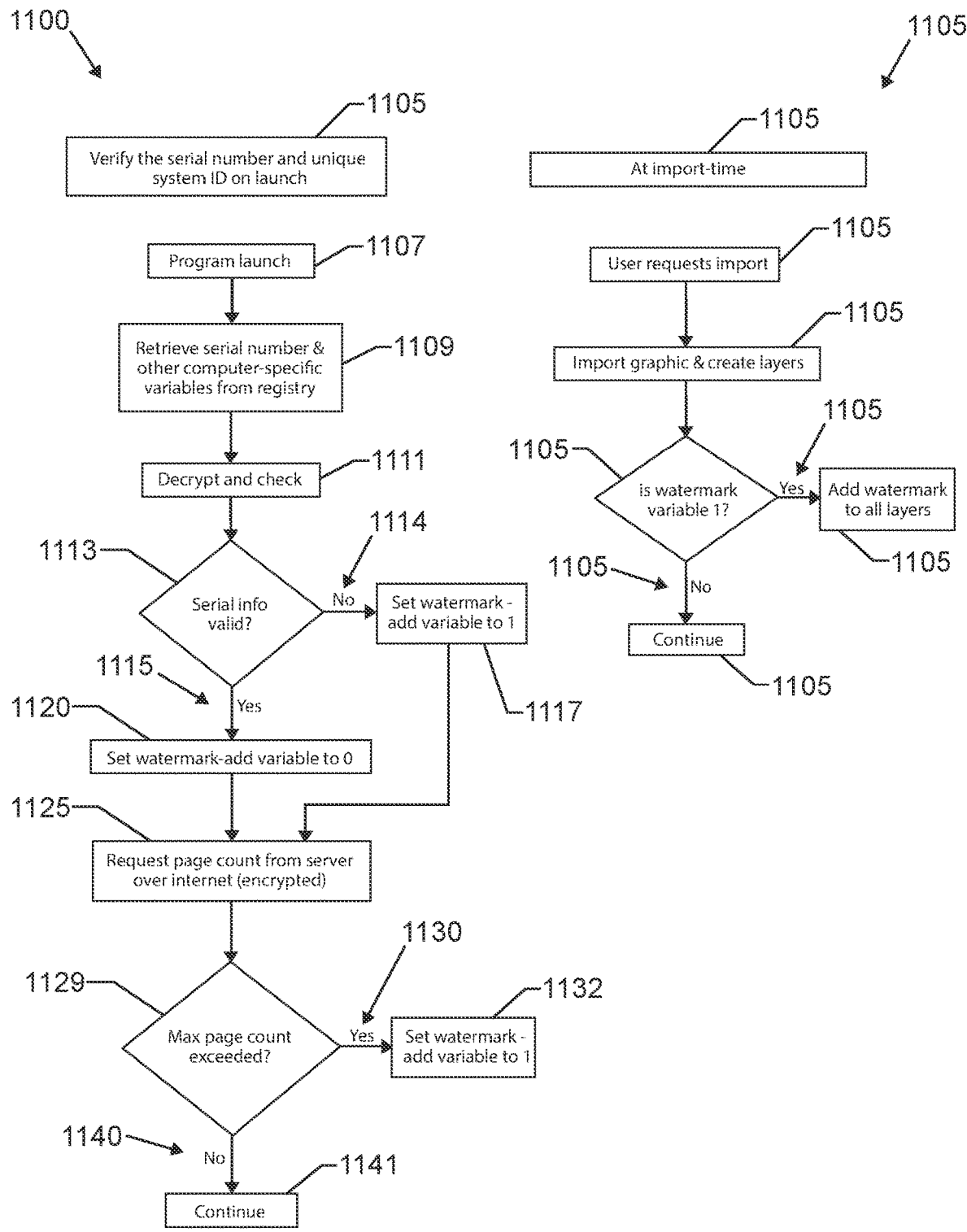
FIG. 10 is a flow block diagram showing serialization and verification.

FIG. 10 is a flow block diagram showing serialization and verification. To ensure system integrity and to prevent unauthorized use, the systems and methods of the present disclosure may preferably include one or more computer-based verification processes. Should the verification process fail, the system may only allow printing of a user's image with a watermark over it. For purposes of control, security, and monetization of the system, some embodiments of the system may require a serial number and a validation code. If either is missing, all output will contain a watermark. At the time of start up, the computer-based software program may: (1) get the encrypted serialization information from the registry; (2) decrypt it; and (3) check its validity. The system may then acquire a page count from a web server. If either the page count is depleted or the serialization information is not valid, a watermark is added to any graphic that is imported. This prevents fraud and illicit use.

In one embodiment 1100, the verification check may preferably be commenced during system launch 1105. During program launch 1107, the software running some of the steps of the methods and system of the present disclosure may preferably recall computer-specific variables generated from product registry 1109. The product registry comes from when the electronic application was purchased by a user and is only valid with that single copy of the electronic application that belongs to that user. Illicit copies made of the electronic application will not be properly registered and thus, will not work. The registry may preferably be accessed by the electronic application upon startup. The system may then decrypt and check the serial information of the software 1111. If the serial information 1113 is deemed invalid 1114, the system may set a watermark-add variable to 1 (one) 1117, which means a watermark should be added. If the serial information 1113 is valid 1115, the watermark-add variable may be set to 0 (zero) 1120, which means a watermark should not be added. In addition to verifying encrypted serialization information, the system, via the computer-based software of the system, may verify a page count from a web server 1125. If the maximum page count 1129 is exceeded 1130, the software may set the watermark-add variable to 1 (one) 1132, if not 1140, the software may set the watermark-add variable to 0 (zero). Once the user imports the graphic and creates layers, a watermark may preferably be applied to the image if watermark-add variable is set to 1. The watermark may preferably be applied to all layers and the print job may continue 1141. In other embodiments, the watermark may be added only one of the two layers.

Figure 11:
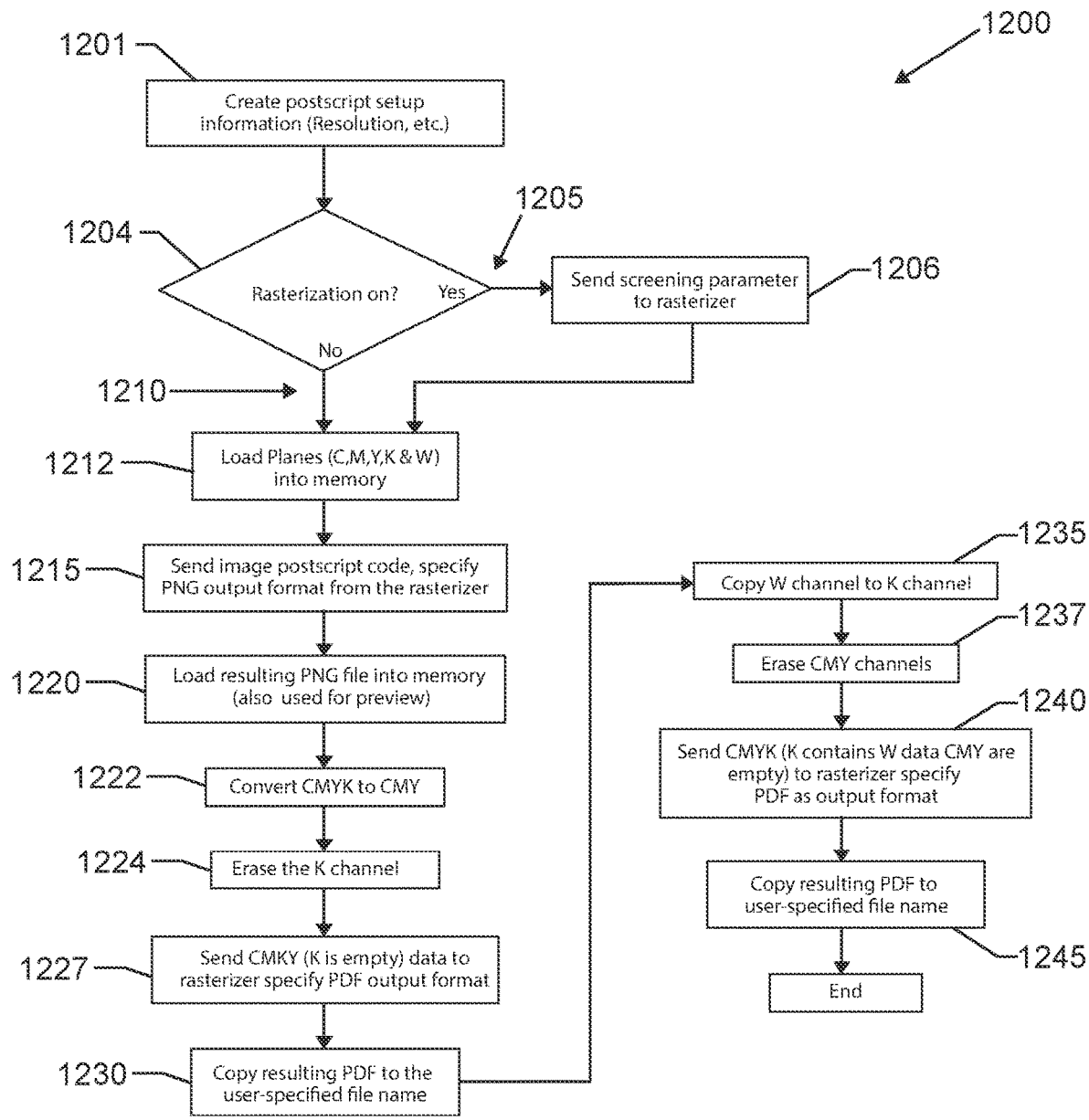
FIG. 11 is a flow block diagram showing final file creation.

FIG. 11 is a flow block diagram showing final file creation. FIG. 11 shows the systems and methods for creating a white layer and color layer for an image file, preferably in a PDF format. The computer-based software of the system may preferably perform PDF file creation 1200 by creating postscript setup information 1201 and verifying if rasterization has been selected 1204. If yes 1205, then the screening parameters are sent to and/or received by the rasterizer 1206. After rasterization confirmation of no 1210 or after the screening parameters are sent to and/or received by the rasterizer 1206, the final files may be loaded into memory, which may consist of C, M, Y, K, and W data 1212. The rasterization screening parameters may be pre-set parameters that are automatically applied to the image file OR, The rasterization screening parameters allow the resulting layers to be rasterized later. The image postscript code may be sent, preferably specifying the PNG output format from the rasterizer 1215. Another step may be to load the resulting PNG file into memory, which, in some embodiments may preferably be used for preview within the user software 1220. Preferably the data within the CMYK channels are converted to the CMY channels 1222, after which, the K channel may be erased/deleted 1224. The CMYK data (K is preferably empty) may then be sent to the rasterizer where the user may preferably specify the PDF output format 1227. After rasterization, the resulting pdf file will preferably be copied to the user-specificized file name 1230. The user may preferably save the white layer in PDF format, if desired, the software may then copy the W channel to the K channel 1235 and may subsequently erase the CMY channels 1237. The CMYK data may then be sent to the rasterizer where the user may preferably specify the PDF output format 1240. As a result, the K channel contains W data and CMY channels are empty. The resulting copy may preferably be saved to the user-specified file name 1245.

Figure 12:
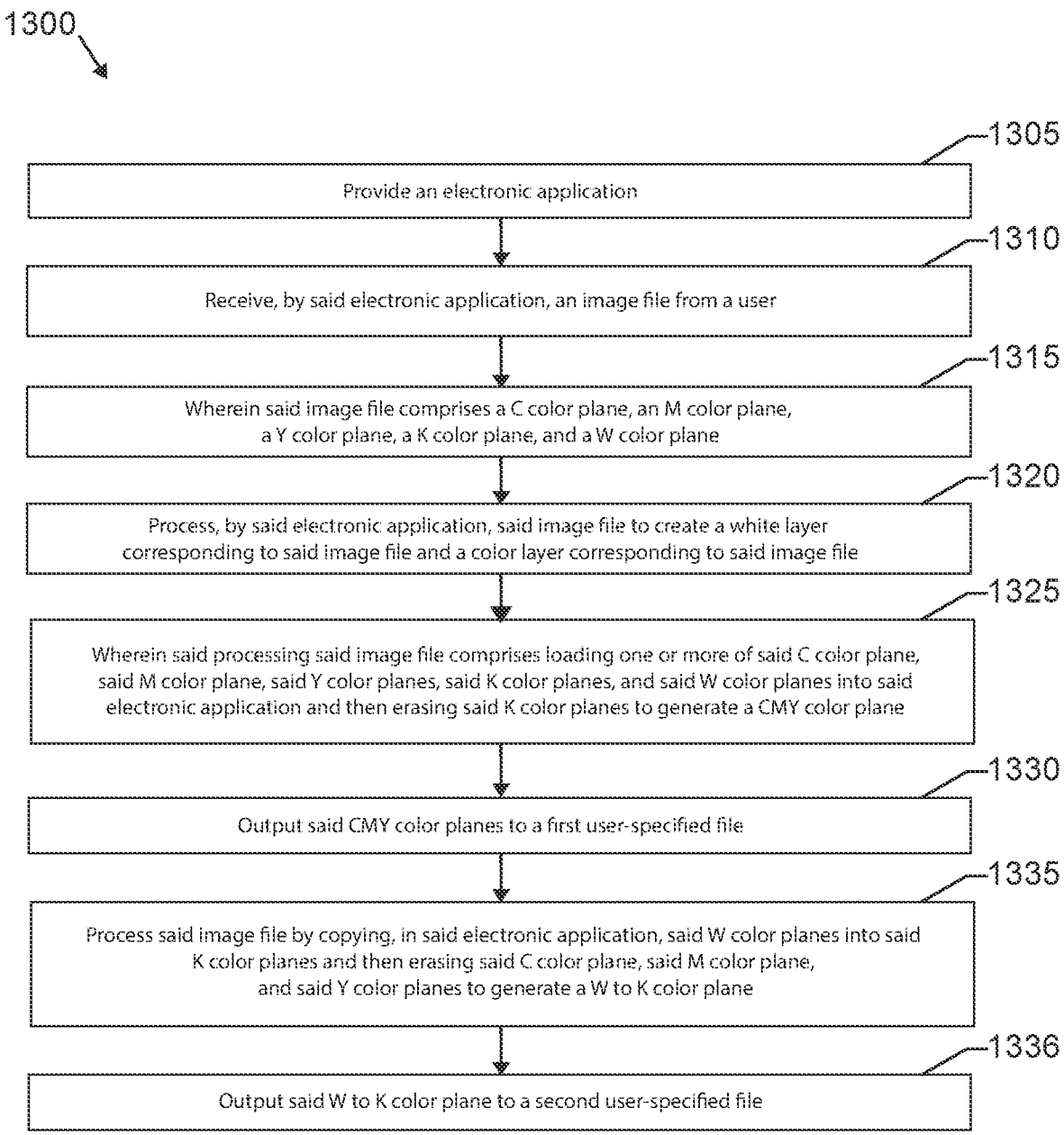
FIG. 12 is a diagram showing the steps of one embodiment for generating a white layer and a color layer for an image.

FIG. 12 is a diagram showing the steps of one embodiment for generating a white layer and a color layer for an image. Providing a computer-based software application 1305. The method may also comprise providing at least one user device and at least one user printer connected (wirelessly or by wire) to the user device. Preferably the application 1305 is run on at least one user device and the user device is connected via the internet to a server that may provide certification, verification, and software updates. The application is sent and/or receives one or more image files 1310. The image files may be uploaded from a stored location on the user device or may be transmitted to the user device by a third party. Typically, the user uploads the image file to the application. Preferably, the image file comprises a cyan (C) color plane, a magenta (M) color plane, a yellow (Y) color plane, and a black (K) color plane 1315. The electronic application may process the image file to create a white layer corresponding to the image file and a color layer corresponding to the image file 1320. Preferably, the processing of the image file may comprise loading one or more of the C color plane, the M color plane, the Y color plane, the K color plane, and the white (W) color plane into the electronic application. The processing or splitting may also comprise generating a CMY color plane by erasing (or emptying) the K color plane 1325. Preferably, the W color plane is generated by first copying the CMY color plane (layer) to the W color plane. The pixels/information/data copied to the W color plane may be converted to grayscale and then converted to white on a pixel-by-pixel basis. Preferably, this may take into consideration black handling, which is the gray pixels that might read as black. This handling is shown in FIG. 6, and may comprise removing the gray that reads as black, based on a variable black sensitivity, whether there is white under the black, whether the resulting white pixels are choked, and feathering based on sharpness and/or intensity. Once all of the grayscale pixels are processed and converted to white pixels, the white layer has been generated and can be saved. In some embodiments, the white layer, or W color plane, may be updated in the display and/or rasterized. Preferably the CMY color plane is outputted to a specified file or storage location 1330. Because the K is empty, this becomes the color layer. Preferably, the W color plane may be copied to the empty K color plane and then erasing (or emptying the contents (but not deleting) the C color plane, M color plane, and Y color plane to generate a W to K color plane 1335 (that is, a color plane that once had black data, but now has the W color plane data). The W to K color plane 1335 is outputted to a second specified file or storage location 1336. The saved W to K color plane, once saved is the generated white layer. The finalized, outputted, and saved color layer and white layer may now be printed in two passes. Which layer is printed first depends on whether the print job is an over print or an under print. If printing directly on the final media, the white layer may be printed first and then the color layer is printed. If printing onto a transfer media, such as a sublimation print job, the color layer may be printed first and the white layer is printed second.

Figure 13:
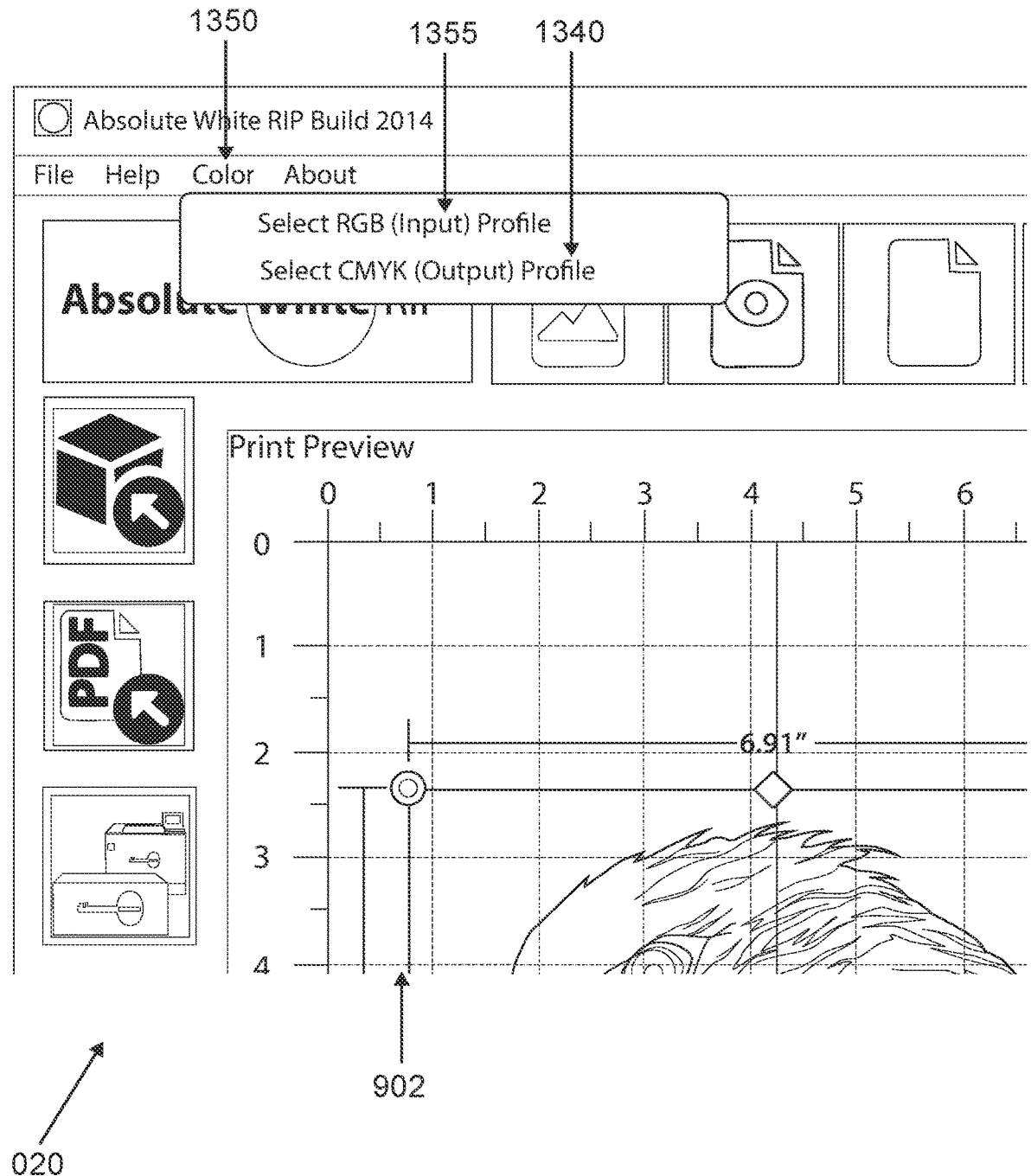
FIG. 13 is an illustration of one embodiment of the user interface for selecting color a profile.

FIG. 13 is an illustration of one embodiment of the user interface for selecting color profiles. As shown in FIG. 13 one embodiment of the GUI 020 for manipulating the images to be printed in two passes showing a color profiles 1350 menu displaying an RGB input profile 1355 and a CMYK output profile 1340. This print preview window 902 may preferably display the image after the user has finished adjusting rasterization and white layer processing. The final image may display on the canvas area over a grided background with dimensions so that users may know the size of the image prior to printing.

Figure 14:
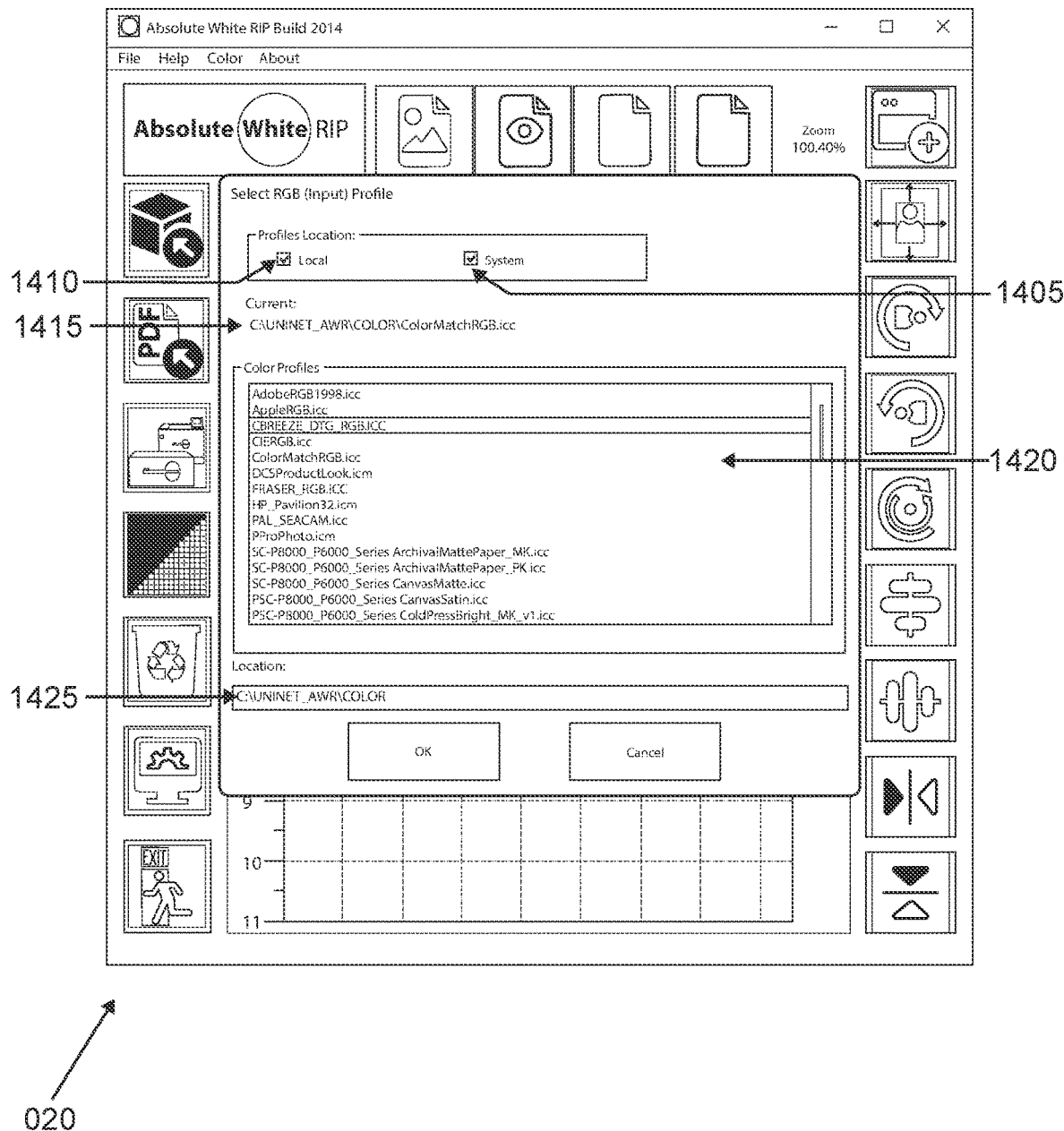
FIG. 14 is an illustration of one embodiment of the user interface for selecting the RGB profile.

FIG. 14 is an illustration of one embodiment of the user interface for selecting the RGB profile. As shown in FIG. 14 one embodiment of the GUI 020 showing the RGB input profile 1355 locations. The RGB input profile 1355 locations may include the system ICCs 1405 list (Windows ICSSs stored in system folder), local ICCs 1410 list, currently selected ICC 1415 (RGB or CMYK) depending on the dialog, list of ICC/ICMs color profiles 1420, and location/name 1425 of ICC selected.

Figure 15:
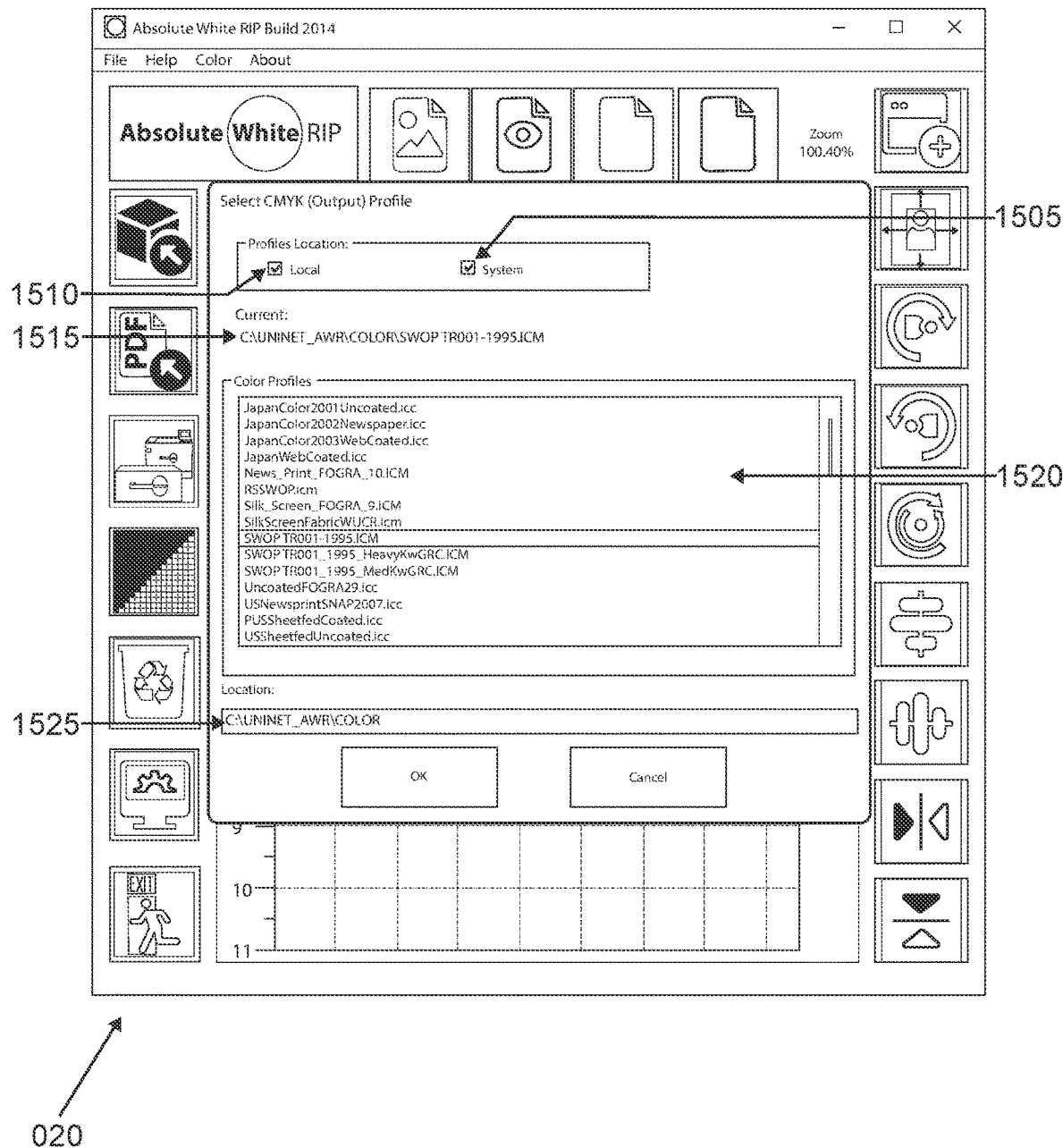
FIG. 15 is an illustration of one embodiment of the user interface for selecting a CMYK profile.

FIG. 15 is an illustration of one embodiment of the user interface for selecting a CMYK profile. As shown in FIG. 15 one embodiment of the GUI 020 showing the CMYK output profile 1340 locations. The CMYK output profile 1340 locations may include the system ICCs 1505 list (Windows ICSSs stored in system folder), local ICCs 1510 list, currently selected ICC 1515 (RGB or CMYK) depending on the dialog, list of ICC/ICMs color profiles 1520, and location/name 1525 of ICC selected.

Some portions of the preceding detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the present disclosure, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The processes or methods depicted in the figures may be performed by processing logic that comprises hardware (e.g., circuitry, dedicated logic, etc.), firmware, software (e.g., embodied on a non-transitory computer readable medium), or a combination thereof. Although the processes or methods are described above in terms of some sequential operations, it should be appreciated that some of the operations described may be performed in a different order. Moreover, some operations may be performed in parallel rather than sequentially.

While the present disclosure has been described in terms of particular variations and illustrative figures, those of ordinary skill in the art will recognize that the disclosure is not limited to the variations or figures described. In addition, where methods and steps described above indicate certain events occurring in certain order, those of ordinary skill in the art will recognize that the ordering of certain steps may be modified and that such modifications are in accordance with the variations of the devices and methods of this disclosure. Additionally, certain of the steps may be performed concurrently in a parallel process when possible, as well as performed sequentially as described above. To the extent there are variations of the devices and methods of this disclosure, which are within the spirit of the disclosure or equivalent to the embodiments found in the claims, it is the intent that this patent will cover those variations as well. Therefore, the present disclosure is to be understood as not limited by the specific embodiments described herein, but only by scope of the appended claims.

What is claimed is:

1. A method of splitting an image into a white layer and a color layer, comprising:
providing an electronic application;
receiving, by said electronic application, an image file;
wherein said image file comprises a cyan (C) color plane, a magenta (M) color plane, a yellow (Y) color plane, a black (K) color plane, and a white (W) color plane;
splitting, by said electronic application, said image file to create a white layer and a color layer;
wherein said splitting of said image file comprises:
loading said C color plane, said M color plane, said Y color plane, said K color plane, and said W color plane into said electronic application;
erasing said K color plane;
generating a CMY color plane; and
outputting said CMY color plane to a first storage location, such that said color layer is generated;
copying, in said electronic application, said W color plane into said K color plane;
erasing said C color plane, said M color plane, and said Y color plane, such that a W to K color plane is generated; and
outputting said W to K color plane to a second storage location, such that said white layer is generated.

2. The method of claim 1, wherein said color layer and said white layer are configured to print in two passes, such that a printed image is created.

3. The method of claim 2, wherein said color layer is printed first.

4. The method of claim 2, wherein said white layer is printed first.

5. The method of claim 1, wherein said creating of said white layer comprises:
converting a white toner data of said W to K color plane to grayscale, such that a grayscale data is created;
converting said grayscale data to final white toner data by one or more of the following:
removing any grayscale data that reads as black, based on a variable black sensitivity;
adjusting a white under the black via a variable scale;
choking said final white toner data; and
feathering, based on sharpness and intensity.

6. The method of claim 1, further comprising:
rasterizing said CMY color plane; and
rasterizing said W to K color plane.

7. The method of claim 6, wherein said electronic application is configured to receive one or more rasterization parameters for the rasterizing of said CMY color plane and said W to K color plane.

8. The method of claim 7, wherein said one or more rasterization parameters is selected from the group of parameters consisting of: spot-shape; angle of said spot-shape; and frequency of said spot-shape.

9. The method of claim 6, further comprising:
previewing said CMY color plane or said W to K color plane being rasterized in a pixel preview window.

10. The method of claim 9, further comprising:
selecting, via a preview area selector window, which portion of said CMY color plane or said W to K color plane displays in said pixel preview window.

11. The method of claim 1, wherein said electronic application is configured to run on one or more computing devices;
wherein said one or more computing devices are configured to be in communication with one or more printers that are configured to print said color layer and said white layer in two passes.

12. The method of claim 1, wherein said electronic application is configured to run on one or more computing devices;
wherein said one or more computing devices are one or more printers that are configured to print said color layer and said white layer in two passes.

13. The method of claim 1, further comprising:
registering said electronic application;
providing said electronic application with serial information;
verifying that a serial information of said electronic application is valid; and
if said serial information is not valid, then a watermark is added to at least one of said white layer and said color layer.

14. The method of claim 1, further comprising:
verifying that a maximum page count has not been exceeded; and
if said maximum page count has been exceeded, then a watermark is added to at least one of said white layer and said color layer.

15. The method of claim 1, further comprising:
exporting said white layer and said color layer to a canvas area for formatting, such that a preview image is created; and
creating an output image file.

16. The method of claim 15, wherein said output image file is saved as a PDF.

17. The method of claim 15, wherein said output image file is configured to be saved in one or more sizes.

18. The method of claim 17, wherein said output image file comprises all data on said canvas area.

19. The method of claim 17, wherein said output image file comprises only image data on said canvas area.

20. The method of claim 15, further comprising:
formatting said canvas area via a plurality of design parameters;
wherein said plurality of design parameters are selected from the group of design parameters consisting of: expanding said preview image to fill said canvas area; rotating said preview image; flipping said preview image; centering said preview image within said canvas area; setting a size of said canvas area; altering said size of said canvas area; and combinations thereof.

21. A method of splitting an image into a white layer and a color layer, comprising:
providing an electronic application;
receiving, by said electronic application, an image file;
wherein said image file comprises a cyan (C) color plane, a magenta (M) color plane, a yellow (Y) color plane, a black (K) color plane, and a white (W) color plane;
splitting, by said electronic application, said image file to create a white layer and a color layer;
wherein said splitting of said image file comprises:
loading said C color plane, said M color plane, said Y color plane, said K color plane, and said W color plane into said electronic application;
erasing said K color plane;
generating a CMY color plane;
outputting said CMY color plane to a first storage location, such that said color layer is generated;
copying, in said electronic application, said W color plane into said K color plane;

erasing said C color plane, said M color plane, and said Y color plane, such that a W to K color plane is generated;

converting a white toner data of said W to K color plane to grayscale, such that a grayscale data is created;

converting said grayscale data to final white toner data by one or more of the following:

removing any grayscale data that reads as black, based on a variable black sensitivity;

adjusting a white under the black via a variable scale;

choking said final white toner data;

feathering, based on sharpness and intensity;

rasterizing said CMY color plane;

rasterizing said W to K color plane; and outputting said W to K color plane to a second storage location, such that said white layer is generated.

22. The method of claim 21, wherein said color layer and said white layer are configured to print in two passes, such that a printed image is created.

23. The method of claim 22, wherein said color layer is printed first.

24. The method of claim 22, wherein said white layer is printed first.

25. The method of claim 21, wherein said electronic application is configured to run on one or more computing devices;
wherein said one or more computing devices are configured to be in communication with one or more printers that are configured to print said color layer and said white layer in two passes.

26. The method of claim 21, wherein said electronic application is configured to run on one or more computing devices;
wherein said one or more computing devices are one or more printers that are configured to print said color layer and said white layer in two passes.

27. The method of claim 21, further comprising:
exporting said white layer and said color layer to a canvas area for formatting; and
creating an output image file.

28. A method of splitting an image into a white layer and a color layer, comprising:
providing an electronic application;
receiving, by said electronic application, an image file;
wherein said image file comprises a cyan (C) color plane, a magenta (M) color plane, a yellow (Y) color plane, a black (K) color plane, and a white (W) color plane;
splitting, by said electronic application, said image file to create a white layer and a color layer;
wherein said splitting of said image file comprises:
loading said C color plane, said M color plane, said Y color plane, said K color plane, and said W color plane into said electronic application;
erasing said K color plane;
generating a CMY color plane; and
outputting said CMY color plane to a first storage location, such that said color layer is generated;
copying, in said electronic application, said W color plane into said K color plane;
erasing said C color plane, said M color plane, and said Y color plane, such that a W to K color plane is generated;

converting a white toner data of said W to K color plane to grayscale, such that a grayscale data is created;
converting said grayscale data to final white toner data by one or more of the following:
removing any grayscale data that reads as black, based on a variable black sensitivity;
adjusting a white under the black via a variable scale;
choking said final white toner data;
feathering, based on sharpness and intensity;
rasterizing said CMY color plane;
rasterizing said W to K color plane;
wherein said electronic application is configured to receive one or more rasterization parameters for the rasterizing of said CMY color plane and said W to K color plane;
wherein said one or more rasterization parameters is selected from the group of parameters consisting of: spot-shape; angle of said spot-shape; and frequency of said spot-shape;
previewing said CMY color plane or said W to K color plane being rasterized in a pixel preview window;
selecting, via a preview area selector window, which portion of said CMY color plane or said W to K color plane displays in said pixel preview window;
outputting said W to K color plane to a second storage location, such that said white layer is generated;
exporting said white layer and said color layer to a canvas area for formatting, such that a preview image is created;
formatting said canvas area via a plurality of design parameters;
wherein said plurality of design parameters are selected from the group of design parameters consisting of: expanding said preview image to fill said canvas area; rotating said preview image; flipping said preview image; centering said preview image within said canvas area; setting a size of said canvas area; altering said size of said canvas area; and combinations thereof;
creating an output image file;
wherein said output image file is configured to be saved in one or more sizes;
wherein said output image file is saved as a PDF; and
wherein said color layer and said white layer are configured to print in two passes, such that a printed image is created.

29. The method of claim 28, wherein said electronic application is configured to run on one or more computing devices;
wherein said one or more computing devices are configured to be in communication with one or more printers that are configured to print said color layer and said white layer in two passes.

30. The method of claim 28, wherein said electronic application is configured to run on one or more computing devices;
wherein said one or more computing devices are one or more printers that are configured to print said color layer and said white layer in two passes.

* * * * *